United States Patent
Lewis

(10) Patent No.: US 9,717,186 B2
(45) Date of Patent: Aug. 1, 2017

(54) CARBON NANOTUBE PRODUCTION METHOD TO STIMULATE SOIL MICROORGANISMS AND PLANT GROWTH PRODUCED FROM THE EMISSIONS OF INTERNAL COMBUSTION

(71) Applicant: N/C Quest Inc., Pincher Creek (CA)

(72) Inventor: Gary Lewis, Pincher Creek (CA)

( * ) Notice: Subject to any disclaimer, the term of this patent is extended or adjusted under 35 U.S.C. 154(b) by 393 days.

(21) Appl. No.: 14/374,739

(22) PCT Filed: Jan. 28, 2013

(86) PCT No.: PCT/CA2013/050058
§ 371 (c)(1),
(2) Date: Jul. 25, 2014

(87) PCT Pub. No.: WO2013/110202
PCT Pub. Date: Aug. 1, 2013

(65) Prior Publication Data
US 2015/0007496 A1      Jan. 8, 2015

Related U.S. Application Data

(60) Provisional application No. 61/591,437, filed on Jan. 27, 2012.

(51) Int. Cl.
*F01N 3/00*      (2006.01)
*A01G 7/02*      (2006.01)
(Continued)

(52) U.S. Cl.
CPC .................. *A01G 7/02* (2013.01); *A01G 9/18* (2013.01); *B01D 53/46* (2013.01); *B01D 53/84* (2013.01);
(Continued)

(58) Field of Classification Search
USPC .................................. 60/272, 274, 286, 295
See application file for complete search history.

(56) References Cited

U.S. PATENT DOCUMENTS

| | | | |
|---|---|---|---|
| 6,093,223 A * | 7/2000 | Lemaire ................... | B01J 23/10 44/354 |
| 7,052,532 B1 * | 5/2006 | Liu ..................... | B01D 39/2075 55/520 |

(Continued)

FOREIGN PATENT DOCUMENTS

| CA | 2611168 | 12/2006 |
|---|---|---|
| CA | 2738082 | 1/2010 |
| CA | 2780061 | 5/2011 |

OTHER PUBLICATIONS

Chien, S.-M., et al. "Effects of Biodiesel Blending on Particulate and Polycyclic Aromatic Hydrocarbons Emissions in Nano/Ultrafine/Fine/Coarse Ranges from Diesel Engine", Aerosol and Air Quality Research, vol. 9, No. 1, pp. 18-31, 2009.

(Continued)

*Primary Examiner* — Binh Q Tran
(74) *Attorney, Agent, or Firm* — Ryan W. Dupuis; Kyle R. Satterthwaite; Ade & Company Inc.

(57) ABSTRACT

A carbon nanotube production system is used for improving plant growth characteristics for a plant growing medium, for example soil in an agricultural field. The system includes an internal combustion engine, for example a tractor engine, which is arranged to combust a fuel mixture therein which includes a blend of fuels and additives including a carbon nanotube seeding material. The engine is operated in pyrolysis to produce exhaust emissions containing black carbon ultrafine and nano soot, for example by towing an agricultural implement across the agricultural field. At least a portion of the exhaust emissions is captured and conditioned to process the carbon soot into carbon nanotubes. The (Continued)

conditioned exhaust emissions and carbon nanotubes therein are then applied to the plant growing medium, for example by using the agricultural implement to incorporate the conditioned exhaust into the soil.

42 Claims, 11 Drawing Sheets

(51) Int. Cl.

| | | |
|---|---|---|
| *F01N 3/02* | (2006.01) | |
| *C01B 31/02* | (2006.01) | |
| *A01G 9/18* | (2006.01) | |
| *C05F 11/00* | (2006.01) | |
| *B01D 53/84* | (2006.01) | |
| *F02D 19/06* | (2006.01) | |
| *F02D 19/08* | (2006.01) | |
| *B82Y 30/00* | (2011.01) | |
| *B82Y 40/00* | (2011.01) | |
| *B01D 53/46* | (2006.01) | |
| *C01B 31/00* | (2006.01) | |
| *F01N 5/00* | (2006.01) | |
| *F23J 15/00* | (2006.01) | |

(52) U.S. Cl.
CPC .............. *B82Y 30/00* (2013.01); *B82Y 40/00* (2013.01); *C01B 31/00* (2013.01); *C01B 31/0226* (2013.01); *C05F 11/00* (2013.01); *F01N 3/02* (2013.01); *F01N 5/00* (2013.01); *F02D 19/0652* (2013.01); *F02D 19/082* (2013.01); *F23J 15/00* (2013.01); *B01D 2257/504* (2013.01); *F23D 2900/21007* (2013.01); *Y02C 10/02* (2013.01); *Y02E 20/326* (2013.01); *Y02E 50/343* (2013.01); *Y02P 20/152* (2015.11); *Y02P 60/24* (2015.11); *Y02T 10/20* (2013.01); *Y02T 10/36* (2013.01)

(56) References Cited

U.S. PATENT DOCUMENTS

| | | | | |
|---|---|---|---|---|
| 7,266,943 | B2 * | 9/2007 | Kammel | B01D 53/9409 60/297 |
| 7,419,516 | B1 * | 9/2008 | Seal | B82Y 30/00 44/301 |
| 7,419,601 | B2 * | 9/2008 | Cooper | A61L 2/0082 210/679 |
| 8,722,002 | B2 * | 5/2014 | Rohlfs | F01N 3/021 423/215.5 |
| 2010/0050619 | A1 * | 3/2010 | Colvin | F24D 13/00 60/311 |
| 2011/0000198 | A1 | 1/2011 | Haik | |
| 2011/0139050 | A1 | 6/2011 | Lewis | |

OTHER PUBLICATIONS

Tripathi, S., et al., "Water Soluble Carbon Nanotubes Affect Growth of the Common Gram (Cicer Arietinum)", Nature Precedings; hdl; 10101/npre.2009.4056.1, pp. 1 to 18, Dec. 8, 2009.

S.M. Chien, Effects of Biodiesel Blending on Particulate and Polycyclic Aromatic Hydrocarbons Emissions in Nano/Ultrafine/Fine/Coarse Ranges from Diesel Engine, Aerosol and Air Quality Research, Mar. 1, 2009, pp. 18-31, http://aagr.org/VOL0_No1_March2009/2_AAQR-08-09-0A-0040_18-31.pdf.

Tripathi, S. et al., Water Soluable Carbon Nanotubes Affect Growth of the Common Gram (Cicer Arietinum), Internet Citation, Dec. 9, 2009, pp. 1-17, http://precedings.nature.com/documents/4056/version/1.

Heejung S. Jung et al., Carbon Nanotubes Among Diesel Exhaust Particles: Real Samples or Contaminants?, Journal of the Air & Waste Management Association, vol. 63, No. 10, Oct. 1, 2013, pp. 1199-1201.

* cited by examiner

CARBON NANOTUBE PRODUCTION METHOD TO STIMULATE SOIL MICROORGANISMS AND PLANT GROWTH PRODUCED FROM THE EMISSIONS OF INTERNAL COMBUSTION

FIELD OF THE INVENTION

The present invention relates to a method whereby internal combustion black carbon soot is produced, during combustion pyrolysis producing ultra-fine to nano meter size particulate matter. More particularly the method relates to the production of single wall carbon nanotubes, multi wall carbon nanotubes and water soluble carbon nanotubes. The described method produces these nanotubes through control of fuel mixtures, fuel additives, combustion control and further conditioning to promote the growth of desired single wall carbon nanotubes, multiwall carbon nanotubes and water soluble carbon nanotubes that are used as bio-stimulants, nano minerals or nano fertilizer. These nano minerals and or nano fertilizers are incorporated into soil, seeds, plants, feed, compost, water or any media or place that microorganisms and plants would benefit from stimulation of RNA, DNA, Anion Exchange Capacity (AEC) and/or Cation Exchange Capacity (CEC).

BACKGROUND

Internal combustion emissions, particularly diesel, can produce large amounts of particulate matter (soot) that cause smog and poor air quality. Resent diesel engine design and emissions controls have lowered the particulate matter. The use of bio-fuel blends and split injection timing can further clean up the visual aspect of emissions. Now the concern is the ultrafine and nano size particulate matter that remains as pollution, causing respiratory problems from emissions.

Carbon nanotubes are recently discovered and are proving to be very useful in the computer chip and biomedical research field.

Recent studies of seed stimulation by carbon soot have demonstrated in a laboratory that seeds germinate and grow faster in the presence of carbon nanotubes.

The following references provide supporting evidence for many of the statements in the accompanying specification and are incorporated herein by reference:
1. Effects of Biodiesel Blending on particulate and Polycyclic Aromatic Hydrocarbons Emissions in Nano/Ultrafine/Fine/Coarse Ranges from Diesel Engine, Shu-Mei Chien, Yuh-Jeen Huang, Shunn-Chuang, His-Hsien Yang, Chien et al. Aerosol and Air Quality Research, Vol. 9, No 1, pp. 18-31. 2009
2. Microstructures and Nanostructures for Environmental Carbon Nanotubes and Nanoparticulate Soots L. E Murr, Int. J. Environ. Res. Public Health 2008. 5 (5) 321-336, International Journal of Environmental Research and Public Health ISSN 1661-7827 www.i-jerph.org 2008 by MDPI
3. Water soluble carbon nanotubes affect growth of the common gram (Cicer arietinum), Shweta Tripathi, Sumit Kumar Sonkar, Abbishek Kumar, M. Y. Khan, and Sabyasachi Sarkar, Nature Precedings; hdl; 10101/npre.2009.4056.1; posted 8 Dec. 2009

SUMMARY OF THE INVENTION

According to one aspect of the present invention there is provided a method for improving plant growth characteristics for a plant growing medium, the method comprising:

providing an internal combustion engine arranged to combust a fuel therein;

adding a carbon nanotube seeding material to the fuel of the international combustion engine to produce a fuel mixture;

operating the internal combustion engine to combust the fuel mixture in pyrolysis to produce exhaust emissions; and capturing at least a portion of the exhaust emissions so as to be arranged for subsequent delivery to the plant growing medium.

Preferably the method further includes i) operating the internal combustion engine to combust the fuel and the carbon nanotube seeding material in pyrolysis to produce black carbon ultrafine and Nano soot in the exhaust emissions, and ii) conditioning the exhaust emissions such that the Nano carbon soot is processed into carbon nanotubes.

According to another aspect of the present invention there is provided a method of producing nano carbon tubes from the emissions of internal combustion engine that is powering an implement. The production process begins in the combustion chamber of the internal combustion engine, The nano particulate matter produced is controlled by the prescribed elements present in the fuel source by blending diesel fuel, bio-fuel and additives. The prescribed element is the seed that starts the carbon nanotube. Nano soot produced at pyrolysis in the combustion process is attracted to the element that starts the tube end forming a carbon lattice tube that has unique properties depending on many described controllable conditions within the described method. Nano carbon soot produced are processed further by through condensing and conditioning described by the method. This process method influences the production of the desired type of carbon nanotube that will stimulate the biology of growing plants with less reliance on fossil fuel. This is accomplished as the implement is performing other tasks or by an engine running for the sole purpose of generating nano soot. The produced carbon nanotubes are directed to the microorganisms, which are present in soil or other media through a distribution system contacting seeds, soil, compost, feed, water and plants that have active microorganisms present that benefit from the presence of carbon nanotubes.

Emissions are controlled in the method by a computer or manual setting that can affect engine load, operating temperature, spark, split injection, timing, air fuel ratio and the type of fuel that can have an effect on the production of particulate matter soot ultrafine and nano carbon that develops into carbon nanotubes in the production chamber, condensing chamber and delivery system.

The method includes metal elements and minerals added to the fuel to produce different types of carbon nanotubes; single wall from metals and double wall from transitional metals. Diameter of the tube and shape also is influenced by the metals burnt in combustion or present when producing carbon nanotubes in the growing chamber. These nanotubes are nano fertilizers produced to specifically eliminate deficiencies within the media without the addition of fossil fuel produced fertilizers.

Bio-fuels are not as consistent in the chemistry makeup, depending on the plant material that produced the vegetable oil, mineral contents can vary and be higher than refined Diesel fuels or petroleum based fuels that contain polycyclic aromatic hydrocarbons. The method therefore will blend fuels and additives for proper formation of desired nanotubes and emissions compounds that are beneficial to the microbiology, soil and plants. Bio-fuels are the focus of the future supplementing or replacing fossil fuels to help lower emissions, especially in agriculture as the technology of recycling emissions and growing bio-fuels without fossil fuel inputs solves the bio fuel energy equation.

Various types of carbon nanotubes are produced in the method by blending the fuel with different metals and minerals to produce the prescribed stimulation to the diverse microorganisms that are present on seeds in the soil on plants etc. Plant growth promoting microorganisms then receive exudates from plants roots. The microorganisms, in return, feedback hormones and proteins or nitrogen fixation back to the plant. The carbon nanotubes stimulate the microorganisms to be more active helping the plant to be more energy efficient and faster growing.

The multi wall carbon nanotubes (MWCT) can be processed in the method with nitric acid and other chemicals to become soluble in water. The condensation of the emissions that contain nitric acid will aid in solubilizing the tubes into water allowing the system to work with sprayers, irrigation water, treatment ponds and waste management, methane production, composters and alga growth for bio fuel production. Solubilized carbon nanotubes stay suspended in solution to facilitate root up take.

Carbon nanotubes by the method may form many sizes and configurations, such as single wall, double wall, multi wall and have unique electrical properties, negative (anion exchange capacity) neutral water soluble and positive (cation exchange capacity). Carbon nanotubes structure is like a sheet of hexagon black carbon atoms rolled unto a lattice structure (Zig-zag tube lattice=0 degree angle) (Chiral tubes lattice=13 degree angle) and (Armchair tube lattice=30 degree angle). Nanotube size, shape, length, lattice configuration, conductivity and characteristics enhance the mineral that is used as the starter seed or catalyst that has formed the tube. Many combinations and configurations of carbon nanotubes are possible depending on the settings controlled by the method, as desired interaction with the biota.

When there is provided a sensing system arranged to sense at least one condition of the exhaust emissions, preferably a computer controller is arranged to controllably vary a ratio of carbon nanotube seeding material to fuel in the fuel mixture in response to variation of said at least one condition of the exhaust emissions sensed by the sensing system.

The computer controller may also be arranged to controllably vary at least one operating condition of the internal combustion engine in response to variation of said at least one condition of the exhaust emissions sensed by the sensing system. The operating condition of the internal combustion engine may be selected from the group consisting of fuel type, timing, split injection, and air/fuel ratio.

The carbon nanotube seeding material may comprise a mineral, a magnetic metal, a transitional metal, an alloy, or other related compounds alone or in combination.

Preferably a conditioning system is arranged to receive and condition the exhaust emissions therein to produce carbon nanotubes.

Preferably low oxygen levels are maintained in the exhaust emissions so as to minimize oxidisation in the conditioning system and so as to minimize production of $NO_2$ in the conditioning system Optionally an incinerator may be operable to combust a respective fuel therein to produce products of combustion such that the conditioning system is arranged to receive and condition the exhaust emissions from the internal combustion engine and the products of combustion from the incinerator therein to produce carbon nanotubes. The incinerator may be used to combust metals or minerals directly or by injecting a water solution containing ionized minerals for example.

In preferred embodiments, the exhaust emissions are directly applied to the plant growing medium immediately subsequent to producing carbon nanotubes in the exhaust emissions.

In some embodiments, phosphorous may be added to the exhaust at the conditioning system.

The method may also include adding DNA in the conditioning system, and maintaining temperature of the conditioning system at an optimum temperature for DNA reproduction.

In some instances, an acid is added to the conditioning system. Optionally the exhaust emissions may be cooled in the conditioning system to condense water vapour in the exhaust emissions and convert NO in the emissions to nitric acid.

A separator may receive the exhaust emissions from the conditioning system to separate the nanotubes from a remainder of the exhaust emissions. This is particularly suited for collected and storage of the carbon nanotube for subsequent use at a different location or at a different time.

Flow through the conditioning system may be enhanced using at least one technique selected from the group consisting of: compressed recirculated gas injection, sonic vibration, mechanical vibration, non-stick surface treatment, and electrostatic repulsion within the conditioning.

An exhaust passage receiving the exhaust emissions therethrough may be shaped to create sonic vibrations in the exhaust emissions as the emissions are directed there through using corrugated material and spirally arranged conditioning elements.

The exhaust passage may include an outer tube surrounding the exhaust passage to define a cooling passage between the outer tube and the exhaust passage and a fan arranged to direct cooling air through the cooling passage.

When an oxygen sensor or a temperature sensor is in communication with the exhaust emissions at the conditioning system, the computer controller may be arranged to control at least one operating condition of the conditioning system or the internal combustion engine in response to an oxygen level or temperature sensed by the sensor.

When using a delivery to deliver the exhaust emissions to the plant growing medium, the temperature sensor may be in communication with the exhaust emissions at the delivery system.

The delivery system may be arranged to deliver the exhaust emissions topically to living plants or in a liquid solution such as irrigation water.

Alternatively the delivery system may include an enclosure and a mixing element arranged to mix the exhaust emissions with organic matter within the enclosure.

In a further arrangement, the delivery system may include ground disturbing elements and injectors for injecting the exhaust emissions into soil disturbed by the ground disturbing elements.

When using an ambient sensor arranged to monitor at least one ambient condition selected from the group consisting of internal combustion engine load, conductivity of the plant growing medium, geographical position, topographical conditions of the plant growing medium, the computer controller may be arranged to control at least one operating condition of the conditioning system or the internal combustion engine in response to said at least one ambient condition monitored by the ambient sensor.

When using a GPS system arranged to determine geographical position of the internal combustion engine relative to the plant growing medium and determine a geographically varying condition of the plant growing medium relative to geographical position, the computer controller may be arranged to control at least one operating condition of the conditioning system or the internal combustion engine in response to the geographically varying condition of the plant growing medium.

When using a condition sensing system arranged to monitor at least one condition of the exhaust emissions, and a data logging tool may be arranged to log said at least one condition of the exhaust emissions.

In some instance a fuel mixture of fuel and carbon nanotube seeding material is provided which includes aromatic compounds.

When the method includes determining a type of plant to be planted in the plant growing medium or at least one condition of the plant growing medium, the fuel mixture can be selected based on said type of plant or said at least one condition by selecting i) one or more fuel additives from a group of fuel additives, ii) one or more fuels from a group of fuel types, or iii) a combination of one or more fuel additives from a group of fuel additives and one or more fuels from a group of fuel types in producing the fuel mixture.

The condition of the plant growing medium can be soil pH or a biodiversity condition representing fungal and bacteria content for example.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
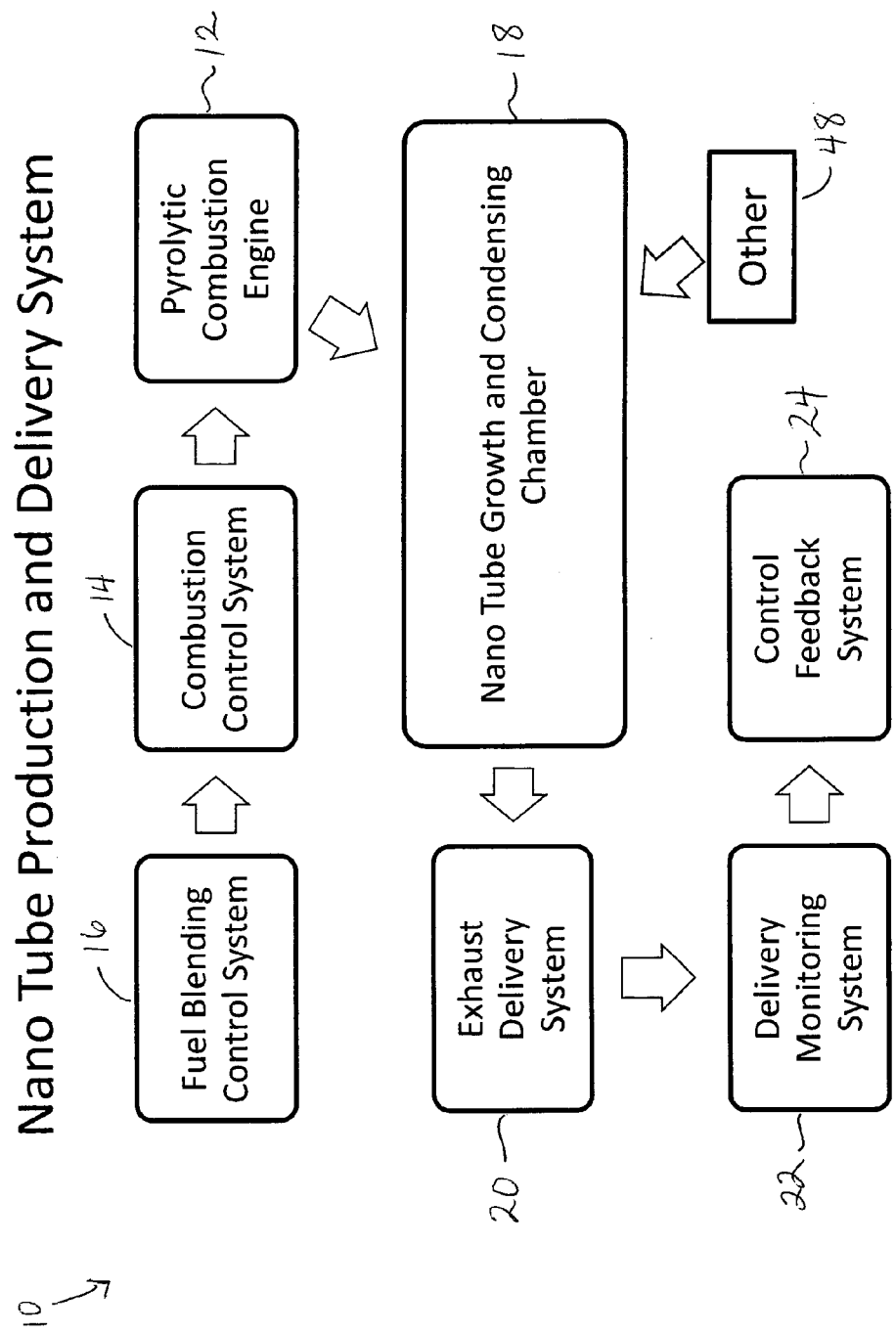
FIG. 1 is a schematic representation of a production system and method for production and delivery of carbon nanotubes to improve plant growth characteristics of a plant growing medium.

Referring to the accompanying drawings, there is illustrated a carbon nanotube production system indicated by reference numeral 10. The production system is suited for improving plant growth characteristics of a plant growing medium, for example agricultural soil. Generally the method involves adding a carbon nanotube seeding material to the fuel of an international combustion engine to produce a fuel mixture which is combusted by the engine in pyrolysis to produce black carbon ultrafine and nano soot in the exhaust emissions which are captured for conditioning such that the nano carbon soot is processed into carbon nanotubes for subsequent delivery to the plant growing medium.

Although the various components of the system will be described in further detail below, the overall production system 10 as shown in FIG. 1 generally includes an agricultural tractor or the like with an internal combustion engine 12 operated by a combustion control system 14 in a pyrolysis air fuel ratio to produce optimum ultra-fine and nano soot black carbon. A fuel blending system 16 introduces into a mixture of various fuels, elements that are the starter seed to the desired carbon nanotubes (CNT) to be produced which can include signal wall carbon nanotubes (SWCNT) 100, double wall carbon nanotube (DWCNT) 102, multi wall carbon nanotube (MWCNT) 104.

An exhaust emissions conditioning system 18 receives the exhaust emissions from the combustion engine to condition the exhaust emissions such that the ultra-fine and nano soot black carbon is processed into the carbon nanotubes. A conditioning chamber of the conditioning system may receive additional materials and additives such as minerals, water, and products of combustion from other sources therein to optimize the environment in the chamber to grow the carbon nanotubes. A condenser can be used to cool the gases to a temperature that stabilises the soot from oxidization and provides a favourable temperature for microorganisms and seed. The carbon nanotube production and condensing chamber allows the carbon nanotubes to grow at low oxygen levels and cool to a stable temperature.

The production system 10 further includes a delivery system 20 which is designed to allow the soot and carbon nanotubes to flow with the emissions gasses that are conditioned in the exhaust conditioning system to allow them to mix with microorganisms at the prescribed conditions. The various conditions of the exhaust emissions at the conditioning system and at the delivery system are monitored by the monitoring system 22.

A computer controller 24 includes a controlling feedback system which monitors many conditions at the exhaust conditioning and delivery systems. The computer controller 24 controls various operating conditions of the internal combustion engine, the fuel blending system, the exhaust conditioning system, and the exhaust delivery system according to the feedback from the various monitored conditions and according to a programmed mix of desired minerals and other additives into the fuel or conditioning chamber to produce the desired size and shape of the carbon nanotube amplifying the minerals that grow the nanotubes.

As described in further detail in the following, the production system 10 is used to produce carbon nanotubes from internal combustion soot, emissions that are emitted when an engine is performing other tasks. A mixture of fuels and additives are combusted in pyrolysis to produce black carbon ultrafine and nano soot in the combustion chamber. The nano carbon soot is processed into carbon nanotubes by controlled emissions conditioning and condensing to produce single wall, double wall, multi wall and soluble carbon nanotubes within a growing and condensing chamber to be utilized as a Nano fertilizer for the stimulation of microbial life in soils, growth media, water and seeds. The carbon nanotubes increase cation and anion exchange to improve soil fertility and plant growth, by the means of incorporating, by gas injection, mixing, auguring, conveying, pumping, spraying, electrostatic deposition or under hoods such as tarpaulin covers. As a result of the influence of the carbon nanotubes stimulating microbial life such as phytohormones and increasing soil fertility, the plants grow larger roots and shoots and the physiology of the plant is altered to rely on sunlight energy. The plant photosynthesizes at a greater rate using more CO2 to supply the biological fertility instead of synthetic energy in the form of macro fertilizer that inhibits the plant physiology from using the sunlight energy and CO2. This reduces the fossil fuel energy consumption of growing plants.

Part of the process can further involve microorganisms which have a DNA single strand 106 that will wrap around the single wall carbon nanotube 100 to form a symbiotic hydrophobic interaction this gives the microorganisms the extra energy to reproduce faster (hybridization). This interaction with the plant increases the plant growth, promoting hormones and proteins from nitrogen fixation that stimulate the plant to store more sun light energy, transferring more carbon CO2 from the air into the soil, such that the plant is stimulated to feed the microbial life faster, powered by the sun.

Fuel Blending

Figure 2:
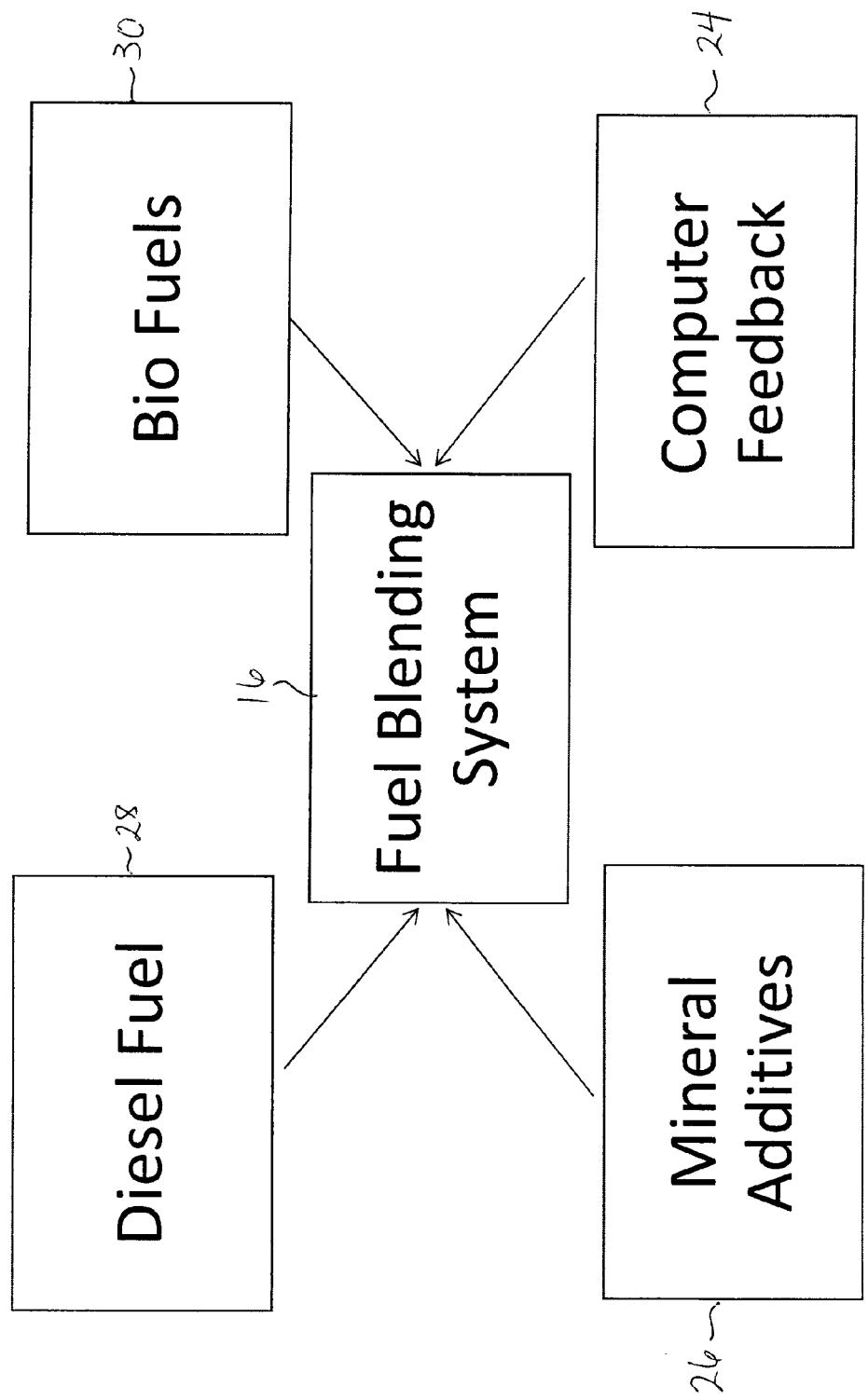
FIG. 2 is a schematic representation of a fuel blending system of the production system according to FIG. 1.

Turning now more particularly to FIG. 2, the fuel blending system 16 accepts input from the computer controller 24 to control the fuel mixtures and additives within the fuel to produce desired carbon nanotube types. For example, various additives 26 including elements, metals, minerals, and compounds can be delivered to the combustion chamber by the fuel source of the engine when mixed with a primary fuel 28 and one or more secondary fuels 30 of the engine to produce a fuel mixture for the engine. The blending system includes a metering device 32 controlling the amount added of each fuel and fuel additive to the resulting fuel mixture so that the ratio of carbon nanotube seeding material to fuel in the fuel mixture can be controllably varied, for example in response to a sensed condition of the exhaust emissions or other conditions as described in further detail below. The resulting additives in the fuel mixture are selected to produce the desired carbon nanotube size and shape if the desired particulate matter (PM) is of ultra-fine or Nano soot size, and coarse PM minimized. Bio-fuels will be the major fuel source reducing the reliance on fossil fuels.

Combustion Control

Figure 3:
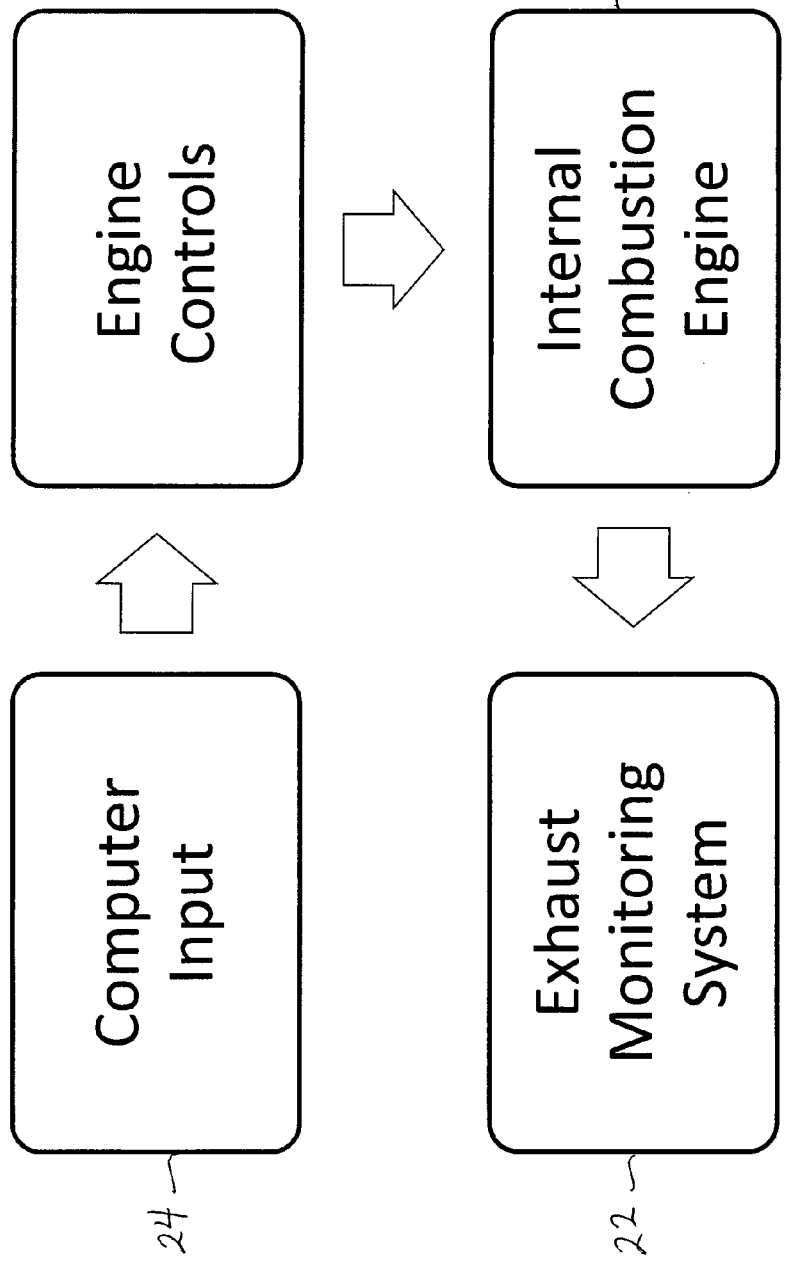
FIG. 3 is a schematic representation of a combustion control system of the production system according to FIG. 1.

Turning now to FIG. 3, the combustion control system 14 receives input from the computer controller 24 to controllably vary one or more operation conditions of the engine by directly communicating with various engine controls 32. The operating conditions of the engine are controllably varied in response to variations of one or more sensed conditions as monitored by the monitoring system 22. The operating conditions of the internal combustion engine which can be controlled include for example fuel type, timing, split injection, and air/fuel ratio.

Exhaust Conditioning

Figure 4:
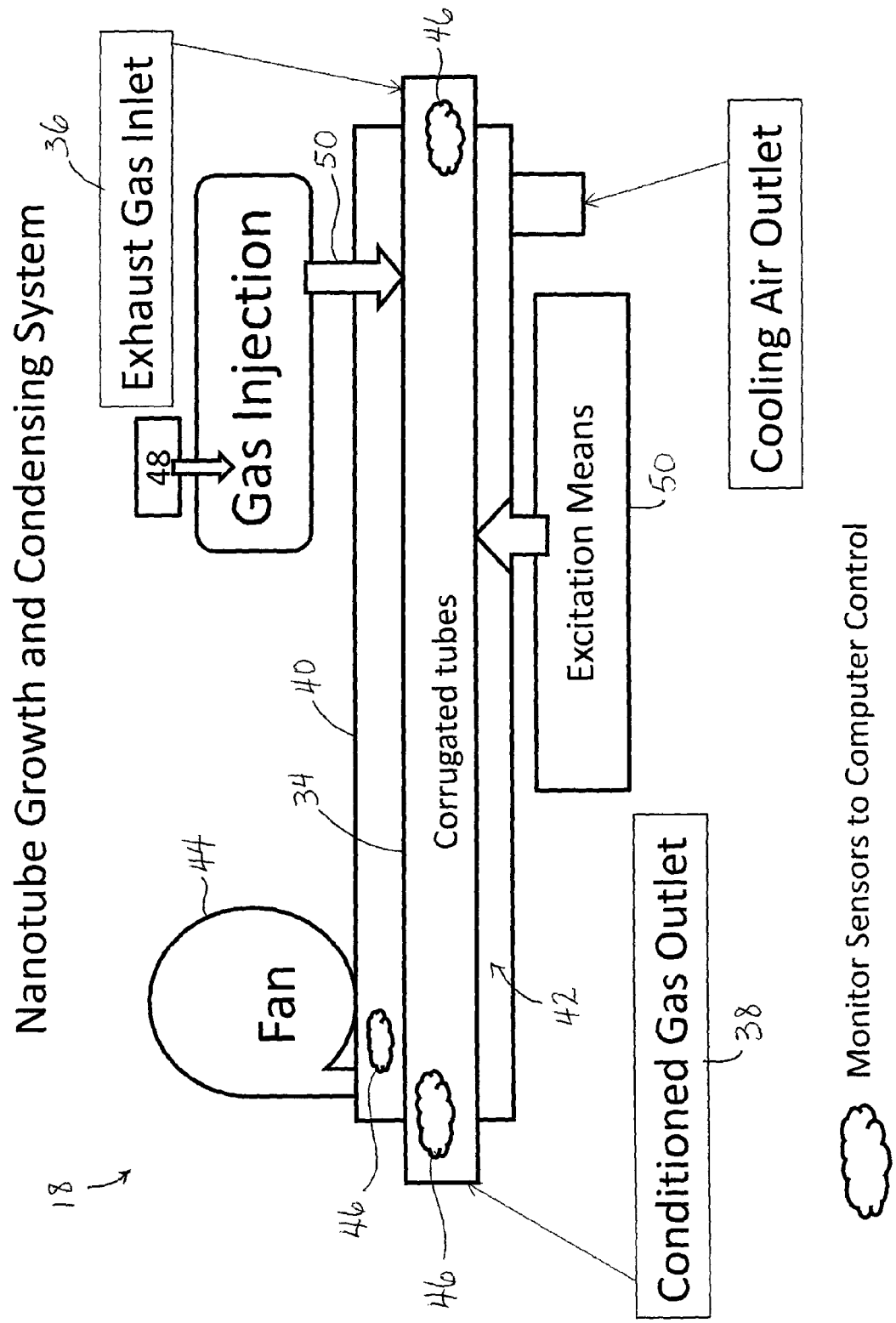
FIG. 4 is a schematic representation of a conditioning system of the production system according to FIG. 1.

Turning now to FIG. 4, the exhaust emissions conditioning system 18 includes a carbon nanotube growth and conditioning chamber arranged to condition the exhaust emissions therein which is generally in the form of a primary exhaust passage 34 arranged to receive the exhaust emissions longitudinally there through from an exhaust gas inlet 36 to an exhaust gas outlet 38. The exhaust passage includes a peripheral boundary to contain the exhaust gases therein. An outer tube 40 surrounds the boundary of the exhaust passage spaced radially outward therefrom along substantially the full length thereof in the longitudinal direction. The exhaust passage is thus generally concentrically receiving within the outer tube to define a generally annular cooling passage 42 between the outer tube and the exhaust passage. A cooling fan 44 directs cooling air longitudinally through the cooling passage in an opposing longitudinal direction relative to the flow of exhaust through the exhaust passage in heat exchanging relationship with the exhaust emissions across the boundary wall about the exhaust passage. The emissions stream is cooled to stabilize the nanotubes, prevent nanotube oxidation, and reduce emissions escape from the media.

A sensing device 46, for example an oxygen sensor and/or temperature sensor is located within the emissions stream adjacent both the inlet 36 and the outlet 38 to provide feedback to the control system. Another sensing device 46 monitors temperature of the cooling air through the cooling passage. The controller operates the conditioning system in response to sensed conditions to maintain low oxygen levels in the exhaust emissions so as to minimize oxidisation in the conditioning system and so as to minimize production of $NO_2$ in the conditioning system.

The exhaust passage includes corrugated material spirally arranged conditioning elements so as to be shaped to create sonic vibrations in the exhaust emissions as the emissions are directed there through. More particularly corrugated tubes are arranged on a slight spiral arrangement assisting with the growth of carbon nanotubes and creating sonic vibrations that prevents the carbon nanotubes from falling out of the emissions gas stream. The length of the tubes and the material used within the corrugated tubes may be selected to optimize the development of carbon nanotubes. The function of this chamber is to condition and promote growth in an environment of controlled lack of oxygen, NO2 or other oxidizers.

The conditioning system might include the addition of other components from an auxiliary source 48, for example an incinerator. The incinerator is operable to combust a respective fuel therein to produce products of combustion which are directed to the conditioning chamber of the conditioning system to be mixed with the exhaust emissions in producing carbon nanotubes. The incinerator can receive various minerals or metals for combustion therein which can be delivered in water containing ionized minerals for example. Furthermore, oils containing metals and elements not suitable for adding to the fuel can be combusted in pyrolysis through an incinerator to aid in the production of nano carbon tubes at the conditioning system.

If additional additives are required, they can be added directly, or by use of the incinerator so that the resulting products of combustion are injected by gas injection 50 into the exhaust passage adjacent the exhaust inlet 36.

Additional excitation 52 can also be introduce to the exhaust passage to further assist formation of nanotubes and prevent the carbon nanotubes from falling out of the emissions gas stream. The additional excitation 52 can include compressed recirculated gas injection, sonic vibration, mechanical vibration, non-stick surface treatment and/or electrostatic repulsion within the transfer and conditioning systems to allow free flow of the carbon nanotubes to the media. The excitation enhances flow through the conditioning system.

Phosphorous may also be added to the exhaust emissions at the conditioning system.

Furthermore, microorganism DNA can be provided in the conditioning system in which case the temperature of the exhaust passage of the conditioning system is maintained at an optimum temperature for DNA reproduction.

An acid may also be added to the conditioning system or encouraged to be produced in the exhaust emissions in the conditioning system. For example cooling the exhaust emissions in the conditioning system to condense water vapour in the exhaust emissions can assist in converting NO in the emissions to nitric acid.

Exhaust Delivery

Figure 5:
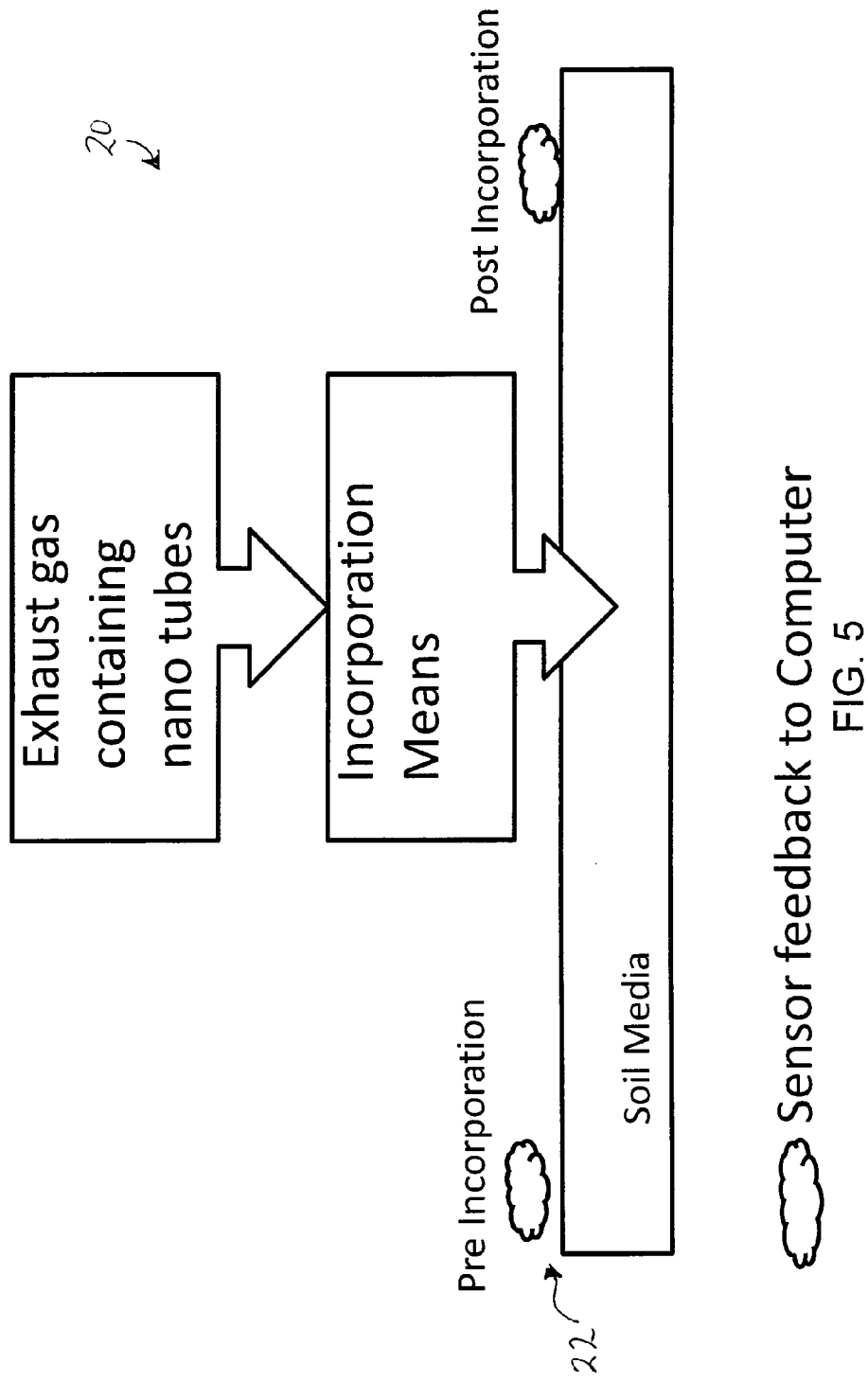
FIG. 5 is a schematic representation of a delivery and monitoring system of the production system according to FIG. 1.
Figure 6:
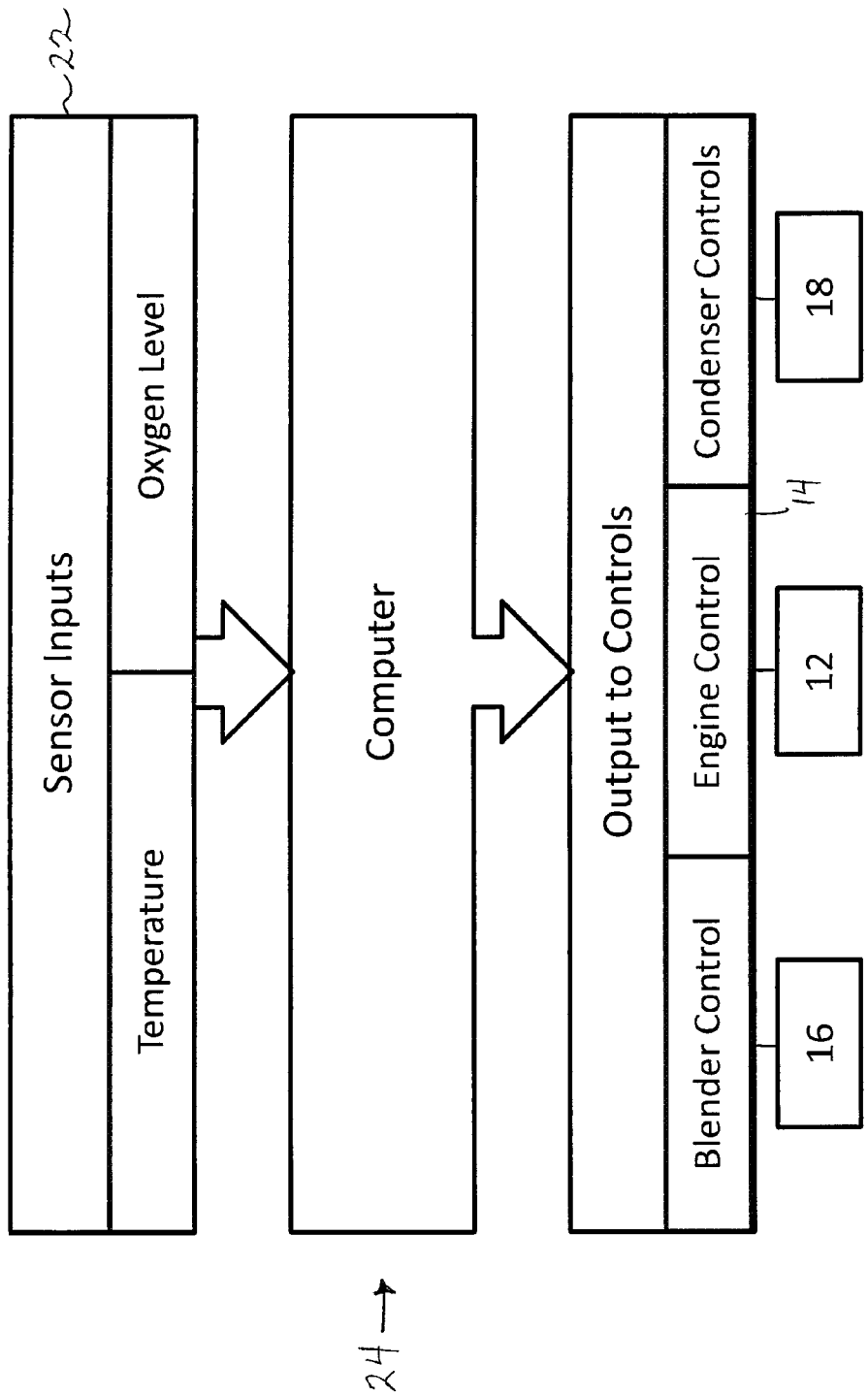
FIG. 6 is a schematic representation of a computer control system of the production system according to FIG. 1.
Figure 7:
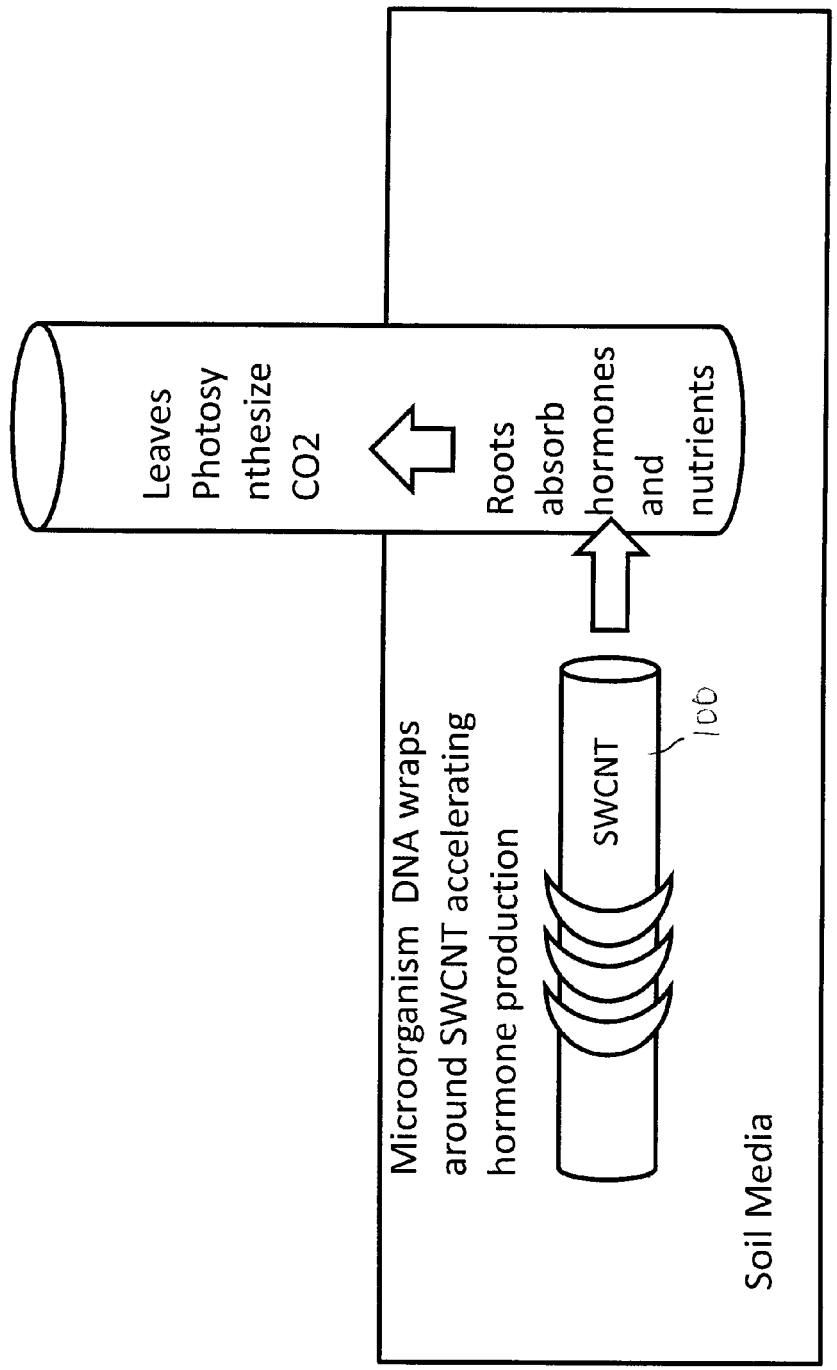
FIG. 7 is a schematic representation of the functionality of single wall carbon nanotubes produced according to the production system of FIG. 1.
Figure 8:
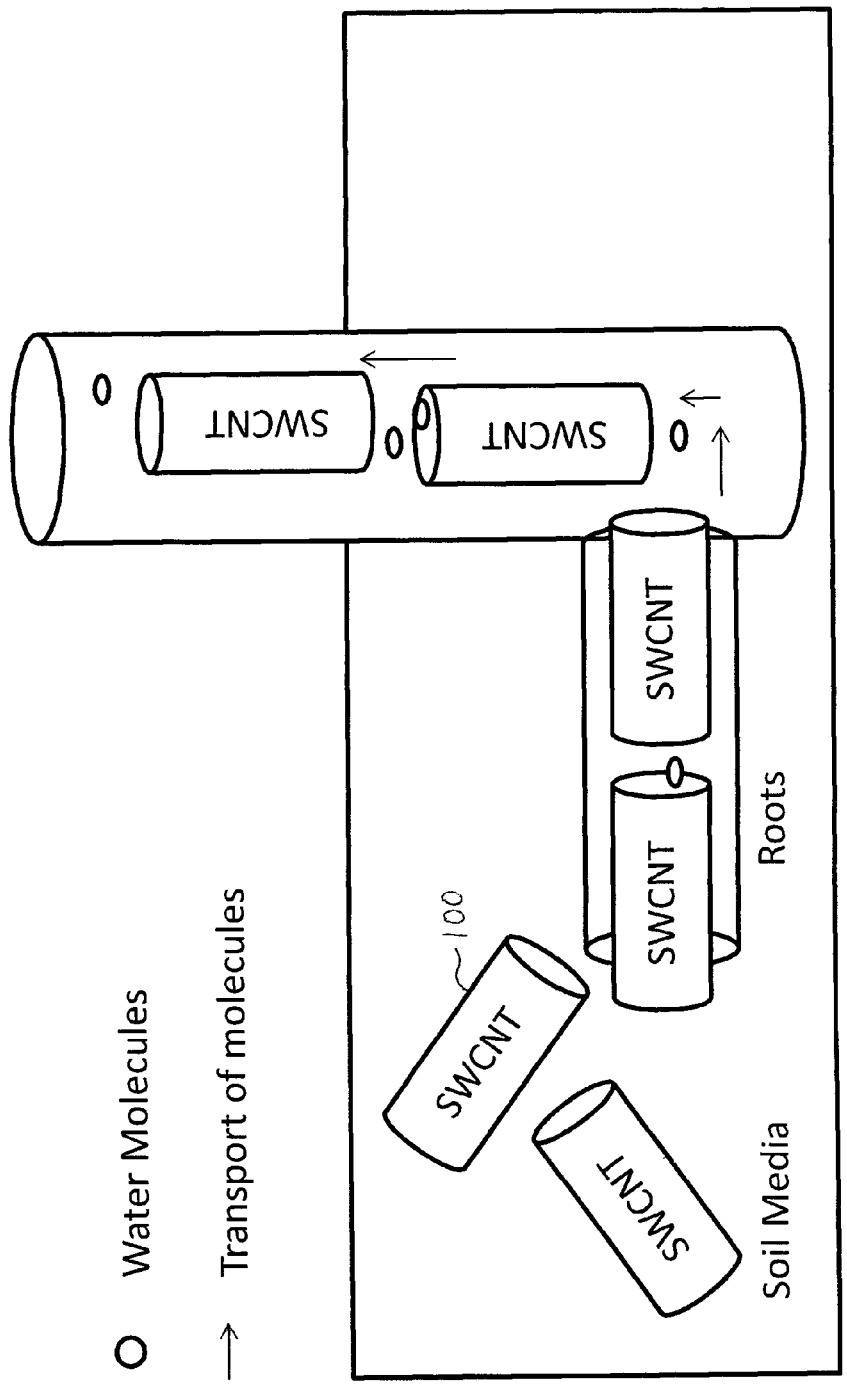
FIG. 8 is a schematic representation of the functionality of water soluble single wall carbon nanotubes produced according to the production system of FIG. 1.
Figure 9:
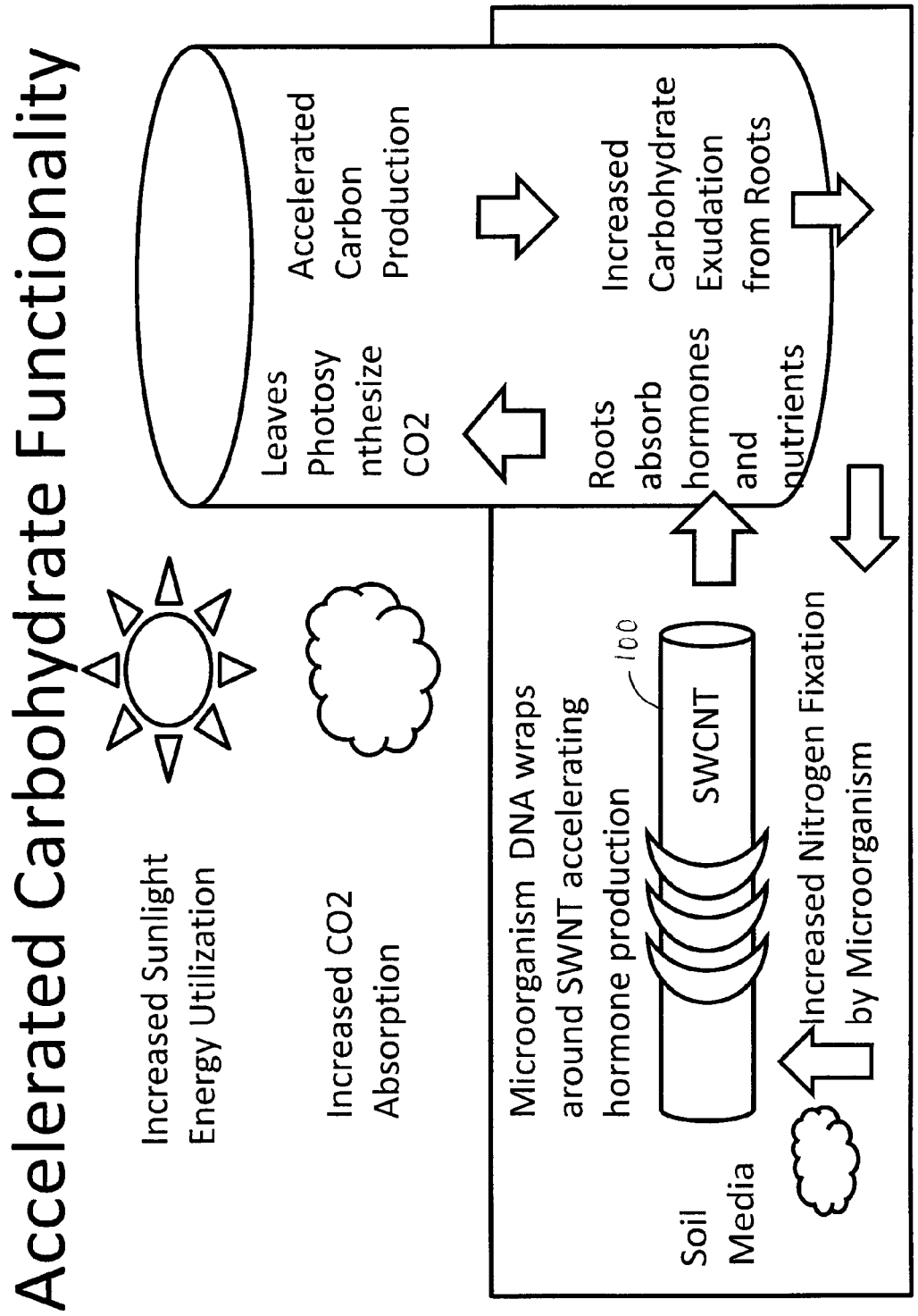
FIG. 9 is a schematic representation of accelerated carbohydrate functionality of single wall carbon nanotubes produced according to the production system of FIG. 1.
Figure 10:
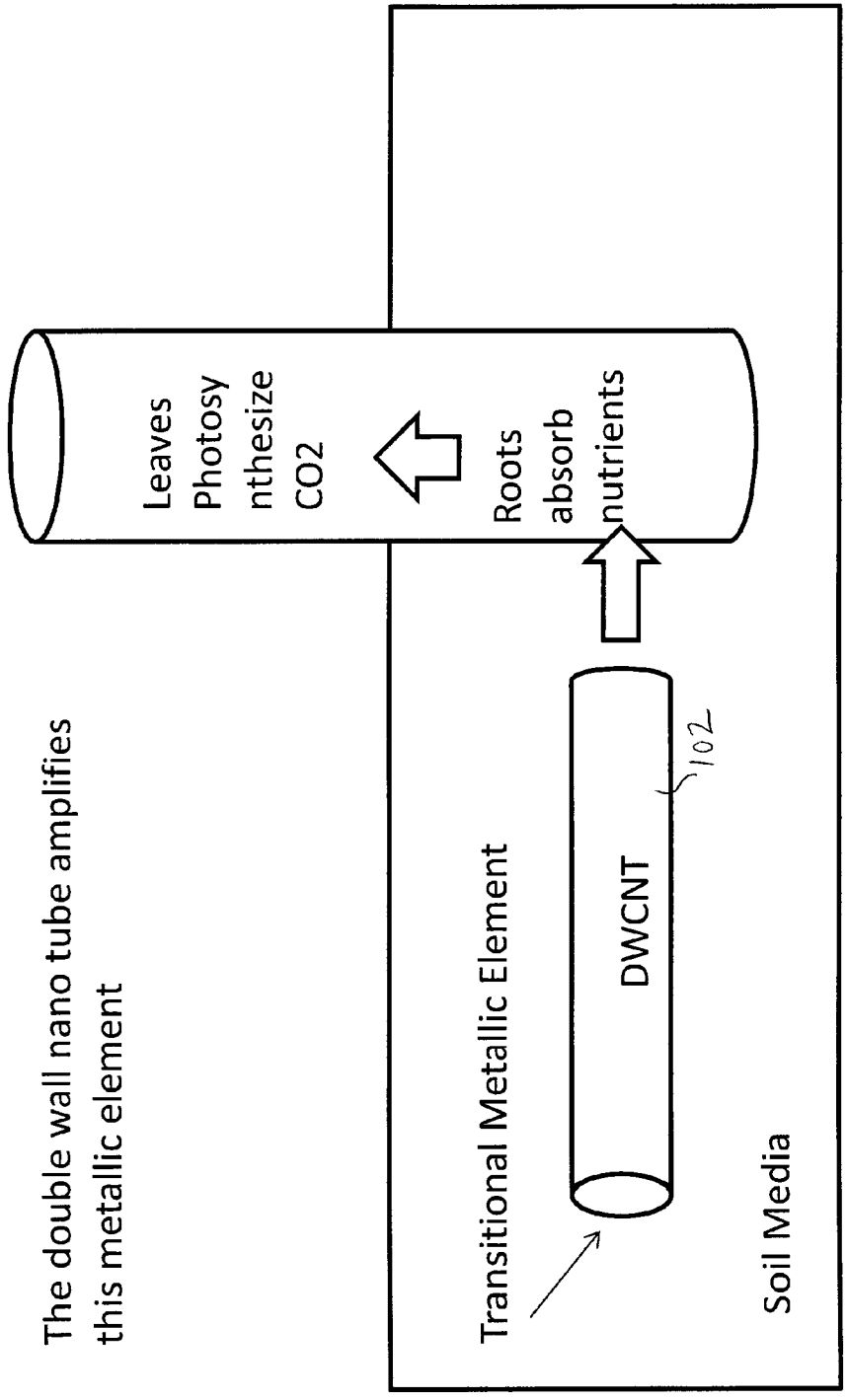
FIG. 10 is a schematic representation of the functionality of double wall carbon nanotubes produced according to the production system of FIG. 1.
Figure 11:
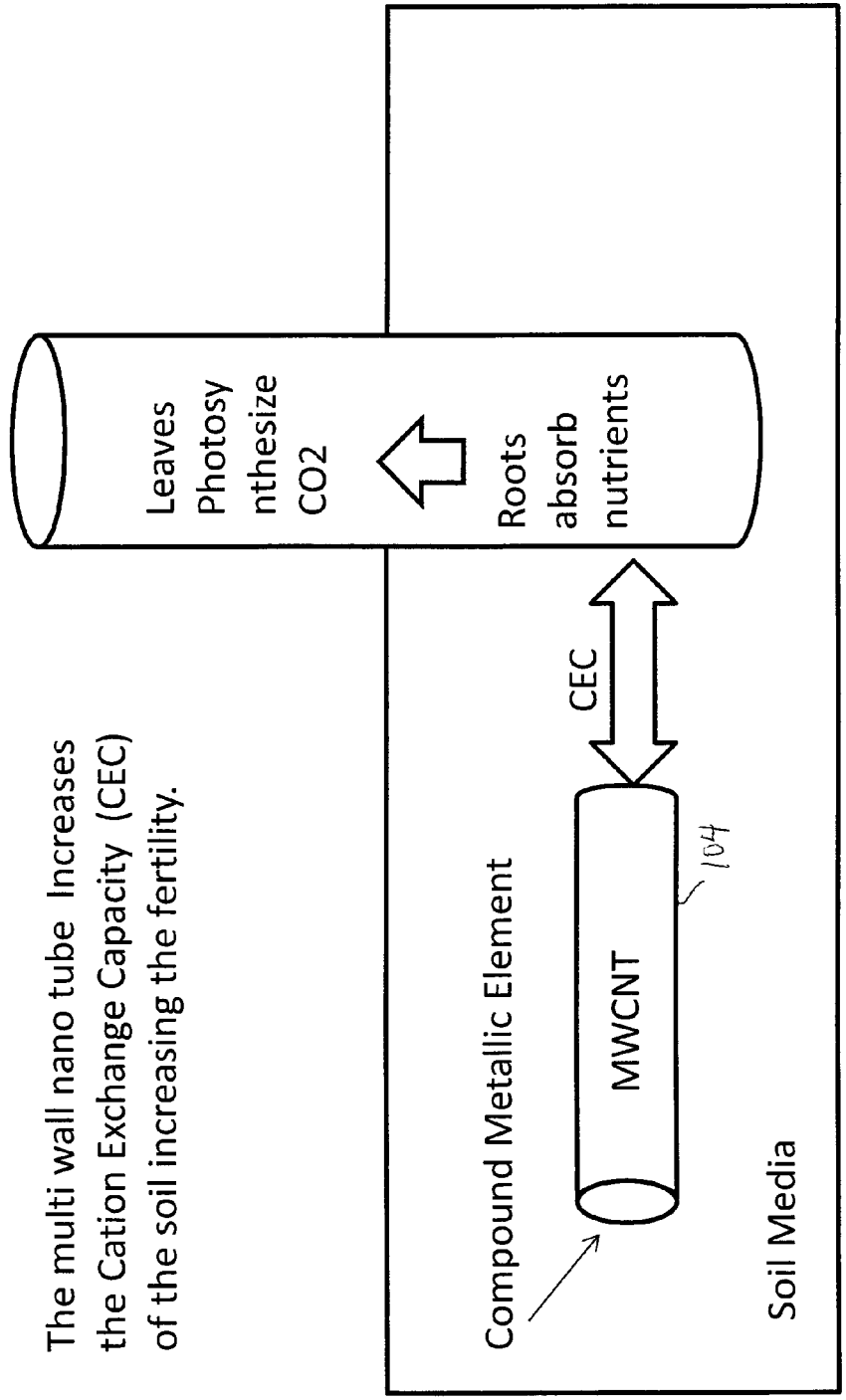
FIG. 11 is a schematic representation of the functionality of multi wall carbon nanotubes produced according to the production system of FIG. 1.

In a preferred embodiment of the delivery system according to FIG. 5, the delivery system directs the exhaust emissions directly into the plant growing medium immediately subsequent to producing carbon nanotubes in the exhaust emissions. The carbon nanotubes are thus immediately contacting the microbial life or growth media with the emissions gases, utilizing no separation or storage in the system after the process of producing and cooling until the carbon nanotubes and gasses are incorporated into the media of the task of the engine and not emitted into the atmosphere as pollution.

In one embodiment, the engine is a tractor engine which tows an agricultural implement such as a harrow across the ground which is the plant growing medium. The components of the production system are carried across the field with the tractor and implement. The exhaust from the tractor is immediately processed by the conditioning system as it is produced. The delivery system in this instance involves various tubing for injecting the conditioned emissions and resulting carbon nanotubes into the ground disturbed by the implement or into a hood enclosing the ground disturbing elements of the implement for mixing with the disturbed organic material to be subsequently retained in the ground for uptake by a crop planted in the field.

The delivery system thus includes the ground disturbing elements and gas injector tubes for injecting the exhaust emissions into soil disturbed by the ground disturbing elements. Alternatively, the carbon nanotubes can be placed in liquid solution and delivered for injection into the ground by liquid tube injectors which augment or replace gas delivery.

The delivery system can further include an enclosure and a mixing element arranged to mix the exhaust emissions with organic matter within the enclosure. Examples include: i) a hood formed by a tarp covering a ground harrow towed by a tractor in which the tractor emissions are used to produce CNT's which are mixed with organic matter from the ground by the tines within the enclosure of the tarp; ii) a mower driven by a combustion engine in which the exhaust of the mower produces CNT's which are mixed with grass clipping in the mower deck; or iii) a tiller in which the exhaust of the tiller motor produces CNT's which are mixed with organic matter in the ground disturbed by the tillage implement within an enclosed hood of the tiller.

In either instance above, the carbon nanotubes are delivered to the plant growing medium by mixing means such as but not limited to tines, shanks, disks, augers conveyors and pumps. This might include delivery of the conditioned emissions stream under a tarp behind a harrow, grass groomer, bio-digesters, composters and algae grow tents in biofuel production.

The emissions stream containing the carbon nanotubes can also be delivered topically to living plants such as grass or algae. The delivery can include injection into a liquid container such as a lagoon or other liquid for subsequent delivery as a liquid solution in spray or irrigation water.

Alternatively, a separator arranged to receive the exhaust emissions from the conditioning system to separate the carbon nanotubes from a remainder of the exhaust emissions. The separator can be a cyclonic or electrostatic or cover system for example to separate the carbon nanotubes from the rest of the exhaust for storage for a later use or to facilitate attachment to the media.

The exhaust system can further include soil sensors 54 which monitor one or more conditions of the plant growing medium both before injection of exhaust emissions and CNT's and subsequent to injection of exhaust emissions and CNT's. The sensed conditions are fed to the computer controller for subsequent action as required. The sensing before incorporation of exhaust into the plant growing medium can be used to determine what types of additives and operating conditions may be desirable to specifically address a detected deficiency of the medium. The sensing after incorporation of exhaust into the plant growing medium can be used for verification purposes.

Monitor and Control

The monitoring system measures temperature and oxygen levels within the entry to the system, the nanotube production chamber, the exhaust conditioning system and the media before and after delivery of the emissions, as well as any other desirable location or condition.

The monitoring system can include oxygen and temperature sensors, pressure sensors and flow meters placed at various places throughout the system such as engine intake, growing and condensing chamber, final delivery system, and ambient environmental surroundings to allow control of optimum carbon nanotube production, incorporation and verification of emissions sequestration. The sensors can monitor ambient conditions such as but not limited to engine load and soil conductivity as well as geographic position and topographic conditions through GPS sensing to control the production of desired carbon nanotube production. The sensors are monitored by a computer control that can be programmed to control the production of the prescribed type of carbon nanotube depending on the needs of the media and the environmental surroundings. The computer will have the ability to interact with GPS mapping and data logging to verify carbon sequestration and emissions produced.

Combustion controls such as timing, split injection, air/fuel ratio, exhaust recirculation, maintaining low oxygen levels downstream within the growing and condensing chamber or delivery system cab be used to optimize the production of carbon nano size soot, thus preventing the oxidisation during the process of producing nanotubes within the conditioning chamber and controlling the production of NO2 which can be deleterious to the carbon nanotubes.

Using an oxygen sensor in communication with the exhaust emissions at the conditioning system or the delivery system, the computer controller is arranged to control at least one operating condition of the conditioning system or the internal combustion engine in response to an oxygen level sensed by the oxygen sensor. Similarly using a temperature sensor in communication with the exhaust emissions at the conditioning system, the computer controller arranged to control at least one operating condition of the conditioning system or the internal combustion engine in response to the exhaust temperature sensed by the temperature sensor.

When an ambient sensor is arranged to monitoring at least one ambient condition selected from the group consisting of internal combustion engine load, conductivity of the plant growing medium, geographical position, topographical conditions of the plant growing medium, the computer controller can also be arranged to control at least one operating condition of the conditioning system or the internal combustion engine in response to the ambient condition monitored by the ambient sensor.

When using a GPS system arranged to determine geographical position of the internal combustion engine relative to the plant growing medium, for example a tractor location relative to an agricultural field, and determine a geographically varying condition of the plant growing medium relative to geographical position, for example using a stored map of field conditions of the agricultural field, the computer controller can be arranged to control at least one operating condition of the conditioning system or the internal combustion engine in response to the geographically varying condition of the plant growing medium.

The computer controller can be further provided with a data logging tool arranged to log sensed conditions of the exhaust emissions according to GPS location for subsequent verification that appropriate levels of CNT's were produced and distributed across the field as desired.

The fuel blending system may be operational in response to actively measured conditions, or may be pre-programmed to blend a specific fuel mixture based on various assessments made prior to operation of the internal combustion engine. The assessment can include determining a type of plant to be planted in the plant growing medium and/or determining at least one condition of the plant growing medium followed by and selecting a fuel mixture based on said type of plant and/or the condition of the plant growing medium. The selection of the fuel mixture can include selecting either i) one or more fuel additives from a group of fuel additives, ii) one or more fuels from a group of fuel types, or iii) a combination of one or more fuel additives from a group of fuel additives and one or more fuels from a group of fuel types in producing the fuel mixture.

Examples of conditions include soil pH, soil mineral content, or a biodiversity condition which represents fungal and bacteria content. Accordingly the fuel blending program matches the type of crop grown and soil PH, mineral content and desired influence on the biological targets, bacterial, fungi, genetic expression DNA, RNA. This allows balancing carbon nanotube types produced, but is not limited to one type of carbon nanotube as combinations and ratios to balance the diverse microbial soil plant interactions are possible by mixing a prescribed fuel mixture to produce the desired effect.

The fuel mixture can also be selected to ensure some aromatic compounds are present due to polycyclic aromatic hydrocarbons emissions having a stimulating effect on mycorrhizal fungi to build organic carbon reserves in the soil and defend host plant from soil borne pathogens. By adding aromatic fuel additives or petroleum based fuel to the internal combustion, carbon nanotubes absorb the aromatic compounds in the conditioning chamber, mixing into soil or seeds to control soil and seed borne pathogens while stimulating beneficial microbial activities that increase plant growth.

Functionality

The single wall carbon nanotubes (SWCNT) can produced through the influence of the magnetic metals such as iron, cobalt, and nickel as well as corresponding metallic oxides introduced at the combustion phase carry a positive charge and a diameter range of 5.5 nanometers with an ability to have a hydrophobic (water insoluble) attraction to facilitate hybridization of microbial life DNA. As a result of the microbial life being hybridized with the (SWCNT), there is a symbiotic relationship established whereby plant hormones produced by the microorganisms stimulate the plant to photosynthesize at a greater rate accelerating the absorption of CO2 from the atmosphere As a result of the extra photosynthesizing and phytohormone production, the plant is maintaining an accelerated carbon flow to the roots and microbial life. The increased carbon flow to the roots increases the source precursors to the microorganism phytohormone production. The resulting bacteria colonization will have an increased ability to fix nitrogen from the air and fungal mineralization of the soil or organic matter improving soil fertility and phosphorus availability from the unavailable soil minerals. The resulting (SWCNTs) carry a positive charge which can be an anion exchanger that can be introduced by the system into the media or anions such as phosphorus and boron solutions to store these anions in the available form and prevent it from soil tie-up by recombining with calcium or aluminum in the soil or growth media. Phosphorus rich (SWCNTs) produced can be modified by the system through the influence of added phosphorus by means of phosphorus rich oil or phosphorus rich water bath or spray within the condensing chamber, producing a phosphorus rich nanotube. The purpose is to improve the phosphorus availability to the microorganism and the plant life and prevent phosphorus from becoming unavailable.

Double wall carbon nanotubes (DWCNTs) can be produced to amplify the transitional metals and elements introduced at combustion for the production of the carbon nanotube. For example if a transitional metal (calcium, magnesium, potassium) is deficient in the media, that specific transitional metal or its compound will be introduced into the fuel such that the double wall carbon nanotube amplifies this metal relieving the specific deficiency in the media. These insoluble DWCNTs are negatively charged and have the capability of being a cation exchanger.

Multi wall carbon nanotubes (MWCNTs) can be produced by metals and elements or compounds such as brass or other alloys introduced at combustion for the production of the MWCNT amplifies cation exchange capacity (CEC) of the soil to improve fertility and nutrient holding capacity. In addition the MWCNT has unique electrical properties to extract plant nutrients from the soil to facilitate the availability of minerals to the plant or production of RNA that facilitates transcription of DNA.

As described herein, the emissions produced are generally passed through a culturing tank within the system or through the growth media where DNA is present. This results in the non-covalent functionalization of the SWCNTs increasing solubility of the carbon nanotubes. This facilitates entry of the resulting hybrid into the root of the plant. These hybrids can include Rhizobium Actinomycetes (legume), azospirillum azotobacter (associated nitrogen fixation), *Azotobacter, klebsiella, rhodosprillium* (free living nitrogen fixation). Temperature of the culturing tank is maintained at an optimum temperature for DNA reproduction. Phosphorus can be added to this culturing tank through the oxidization of high phosphorus oil or added oxidized phosphorus to facilitate the production of DNA carbon nanotube hybrids.

Conditioning of the multiwall carbon nanotubes can be accomplished with nitric acid produced from combustion to improve water solubility. The conversion of NO to nitric acid within the conditioning system may be accomplished by condensation of the water vapour in the emissions by ambient air cooling or additional refrigeration or by additional water. This conditioning can be through contact with the vapour, liquid injection or passing the gasses through a reservoir of acid solution. The purpose of producing water soluble carbon nanotubes (WSCNT) in the described method is to allow the nanotube to enter the root to increase the cation exchange capacity of the plant which accelerates the absorption of water and minerals from the soil. In addition the WSCNTs help the plant withstand the effects of salty soil. This improves the absorption of water even in drought conditions through the improved osmotic ability of the root.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for improving plant growth characteristics for a plant growing medium, the method comprising:

providing an internal combustion engine arranged to combust a fuel therein;

adding a carbon nanotube seeding material to the fuel of the internal combustion engine to produce a fuel mixture;

operating the internal combustion engine to combust the fuel mixture of the fuel and the carbon nanotube seeding material in pyrolysis to produce exhaust emissions including black carbon ultrafine and Nano soot in the exhaust emissions; and conditioning the exhaust emissions in a conditioning chamber by cooling the exhaust emissions in the conditioning chamber to condense water vapor in the exhaust emissions to form condensate and using the condensate to convert NO in the exhaust emissions into nitric acid in the condensate and process the Nano soot into carbon nanotubes;

capturing at least a portion of the exhaust emissions with the carbon nanotubes therein so as to be arranged for subsequent delivery of the exhaust emissions to the plant growing medium.

2. The method according to claim 1 including providing a sensing system arranged to sense at least one condition of the exhaust emissions and a computer controller arranged to controllably vary a ratio of carbon nanotube seeding material to fuel in the fuel mixture in response to variation of said at least one condition of the exhaust emissions sensed by the sensing system.

3. The method according to claim 1 including providing a sensing system arranged to sense at least one condition of the exhaust emissions and a computer controller arranged to controllably vary at least one operating condition of the internal combustion engine in response to variation of said at least one condition of the exhaust emissions sensed by the sensing system.

4. The method according to claim 3 wherein said at least one operating condition of the internal combustion engine is selected from the group consisting of fuel type, timing, split injection, and air/fuel ratio.

5. The method according to claim 1 including maintaining low oxygen levels in the exhaust emissions so as to minimize oxidisation in the conditioning chamber.

6. The method according to claim 1 including maintaining low oxygen levels in the exhaust emissions so as to minimize production of $NO_2$ in the conditioning chamber.

7. The method according to claim 1 including i) providing an incinerator operable to combust a respective fuel therein to produce products of combustion, and ii) a configuring the conditioning chamber to receive and condition the exhaust emissions from the internal combustion engine and the products of combustion from the incinerator therein to produce carbon nanotubes.

8. The method according to claim 7 including combusting metals in the incinerator.

9. The method according to claim 7 including injecting water containing ionized minerals into the incinerator.

10. The method according to claim 1 including directing the exhaust emissions directly into the plant growing medium immediately subsequent to producing carbon nanotubes in the exhaust emissions.

11. The method according to claim 1 wherein the carbon nanotube seeding material comprises a metal.

12. The method according to claim 1 wherein the carbon nanotube seeding material comprises a mineral.

13. The method according to claim 1 wherein the carbon nanotube seeding material comprises a magnetic metal.

14. The method according to claim 1 wherein the carbon nanotube seeding material comprises a transitional metal.

15. The method according to claim 1 wherein the carbon nanotube seeding material comprises an alloy.

16. The method according to claim 1 including providing DNA in the conditioning chamber, and maintaining temperature of the conditioning chamber at an optimum temperature for DNA reproduction.

17. The method according to claim 1 including adding phosphorous to the conditioning chamber.

18. The method according to claim 1 including adding an acid to the conditioning chamber.

19. The method according to claim 1 including providing a separator arranged to receive the exhaust emissions from the conditioning chamber and to separate the nanotubes from a remainder of the exhaust emissions.

20. The method according to claim 1 including enhancing flow through the conditioning chamber using at least one technique selected from the group consisting of: compressed recirculated gas injection, sonic vibration, mechanical vibration, non-stick surface treatment, and electrostatic repulsion within the conditioning.

21. The method according to claim 1 including providing an exhaust passage in the condition chamber arranged to receive the exhaust emissions therethrough which includes corrugated material.

22. The method according to claim 1 including providing an exhaust passage in the conditioning chamber arranged to receive the exhaust emissions therethrough which includes spirally arranged conditioning elements.

23. The method according to claim 1 including providing an exhaust passage in the conditioning chamber arranged to receive the exhaust emissions therethrough, an outer tube surrounding the exhaust passage to define a cooling passage between the outer tube and the exhaust passage, and a fan arranged to direct cooling air through the cooling passage.

24. The method according to claim 1 including providing a temperature sensor in communication with the exhaust emissions at the conditioning chamber, and providing a computer controller arranged to control at least one operating condition of the conditioning chamber or the internal combustion engine in response to an exhaust temperature sensed by the temperature sensor.

25. The method according to claim 1 including providing a delivery system arranged to deliver the exhaust emissions to the plant growing medium, providing a temperature sensor in communication with the exhaust emissions at the delivery system, and providing a computer controller arranged to control at least one operating condition of the conditioning chamber or the internal combustion engine in response to an exhaust temperature sensed by the temperature sensor.

26. The method according to claim 1 including providing a delivery system arranged to deliver the exhaust emissions topically to living plants.

27. The method according to claim 1 including providing a delivery system arranged to deliver the exhaust emissions in a liquid solution.

28. The method according to claim 27 wherein the liquid solution comprises irrigation water.

29. The method according to claim 1 including providing a delivery system including an enclosure and a mixing element arranged to mix the exhaust emissions with organic matter within the enclosure.

30. The method according to claim 1 including providing a delivery system including ground disturbing elements and injectors for injecting the exhaust emissions into soil disturbed by the ground disturbing elements.

31. The method according to claim 1 including i) providing a condition sensing system arranged to monitor at least one condition of the exhaust emissions, and ii) providing a data logging tool arranged to log said at least one condition of the exhaust emissions.

32. The method according to claim 1 providing a fuel mixture of fuel and carbon nanotube seeding material which includes aromatic compounds.

33. The method according to claim 1 including determining a type of plant to be planted in the plant growing medium and selecting based on said type of plant either i) one or more fuel additives from a group of fuel additives, ii) one or more fuels from a group of fuel types, or iii) a combination of one or more fuel additives from a group of fuel additives and one or more fuels from a group of fuel types in producing the fuel mixture.

34. The method according to claim 1 including determining at least one condition of the plant growing medium and selecting based on said at least one condition of the plant growing medium either i) one or more fuel additives from a group of fuel additives, ii) one or more fuels from a group of fuel types, or iii) a combination of one or more fuel additives from a group of fuel additives and one or more fuels from a group of fuel types in producing the fuel mixture.

35. The method according to claim 34 wherein said at least one condition of the plant growing medium includes soil pH.

36. The method according to claim 34 wherein said at least one condition of the plant growing medium includes a biodiversity condition representing fungal and bacteria content.

37. The method according to claim 1 including providing an exhaust passage in the conditioning chamber arranged to receive the exhaust emissions therethrough which is shaped to create sonic vibrations in the exhaust emissions as the emissions are directed there through.

38. A method for improving plant growth characteristics for a plant growing medium, the method comprising:

providing an internal combustion engine arranged to combust a fuel therein;
adding a carbon nanotube seeding material to the fuel of the internal combustion engine to produce a fuel mixture;
operating the internal combustion engine to combust the fuel mixture in pyrolysis to produce exhaust emissions;
using a sensing system to sense at least one condition of the exhaust emissions;
using a computer controller to controllably vary a ratio of carbon nanotube seeding material to fuel in the fuel mixture in response to variation of said at least one condition of the exhaust emissions sensed by the sensing system; and
capturing at least a portion of the exhaust emissions so as to be arranged for subsequent delivery to the plant growing medium.

39. A method for improving plant growth characteristics for a plant growing medium, the method comprising:
providing an internal combustion engine arranged to combust a fuel therein;
adding a carbon nanotube seeding material to the fuel of the internal combustion engine to produce a fuel mixture;
operating the internal combustion engine to combust the fuel mixture in pyrolysis to produce exhaust emissions;
capturing at least a portion of the exhaust emissions so as to be arranged for subsequent delivery to the plant growing medium;
providing a conditioning system arranged to condition the exhaust emissions therein to produce carbon nanotubes;
providing a computer controller arranged to control at least one operating condition of the conditioning system or the internal combustion engine in response to a measured input; and
providing one of the following:
  i) an oxygen sensor in communication with the exhaust emissions at the conditioning system such that the measured input is an oxygen level sensed by the oxygen sensor;
  ii) an ambient sensor arranged to monitor at least one ambient condition selected from the group consisting of internal combustion engine load, conductivity of the plant growing medium, geographical position, topographical conditions of the plant growing medium such that the measured input is said at least one ambient condition monitored by the ambient sensor; or
  iii) a GPS system arranged to determine geographical position of the internal combustion engine relative to the plant growing medium and determine a geographically varying condition of the plant growing medium relative to geographical position such that the measured input is the geographically varying condition of the plant growing medium.

40. The method according to claim 39 including providing the oxygen sensor in communication with the exhaust emissions at the conditioning system such that the computer controller is arranged to control the at least one operating condition of the conditioning system or the internal combustion engine in response to the oxygen level sensed by the oxygen sensor.

41. The method according to claim 39 including providing the ambient sensor arranged to monitor the at least one ambient condition selected from the group consisting of the internal combustion engine load, the conductivity of the plant growing medium, the geographical position, and the topographical conditions of the plant growing medium such that the computer controller is arranged to control the at least one operating condition of the conditioning system or the internal combustion engine in response to said at least one ambient condition monitored by the ambient sensor.

42. The method according to claim 39 including providing the GPS system arranged to determine the geographical position of the internal combustion engine relative to the plant growing medium and determine the geographically varying condition of the plant growing medium relative to geographical position such that the computer controller is arranged to control the at least one operating condition of the conditioning system or the internal combustion engine in response to the geographically varying condition of the plant growing medium.

* * * * *